(12) United States Patent
Garnero et al.

(10) Patent No.: US 8,054,829 B2
(45) Date of Patent: Nov. 8, 2011

(54) COMMUNICATION SYSTEM AND METHOD

(75) Inventors: Pierre Garnero, Grasse (FR); Philippe Bouckaert, Elot (FR); Gilles Coppe, grasse (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 906 days.

(21) Appl. No.: 11/491,801

(22) Filed: Jul. 24, 2006

(65) Prior Publication Data
US 2007/0115994 A1 May 24, 2007

(30) Foreign Application Priority Data
Oct. 21, 2005 (EP) .................................... 05300845

(51) Int. Cl.
*H04L 12/66* (2006.01)

(52) U.S. Cl. ........ 370/353; 370/352; 370/354; 370/355; 370/356; 370/465; 370/466; 370/467

(58) Field of Classification Search .................. 370/352
See application file for complete search history.

(56) References Cited

U.S. PATENT DOCUMENTS

| 2001/0036173 A1* | 11/2001 | Shmulevich et al. ......... 370/352 |
| 2002/0196779 A1 | 12/2002 | Khadri et al. |
| 2003/0108067 A1* | 6/2003 | Craig et al. ................... 370/522 |
| 2003/0128832 A1* | 7/2003 | Beltran et al. ................ 379/229 |
| 2006/0013201 A1* | 1/2006 | Bettis et al. ................... 370/352 |

* cited by examiner

*Primary Examiner* — Daniel J Ryman
*Assistant Examiner* — Jae Y Lee

(57) ABSTRACT

Embodiments of the present invention relate to a communication arrangement for distinguishing between network entities having the same address by translating between the same addresses and surrogate addresses using an intermediary network entity.

10 Claims, 10 Drawing Sheets

COMMUNICATION SYSTEM AND METHOD

FIELD OF THE INVENTION

The present invention relates to a communication system and method.

BACKGROUND OF THE INVENTION

Signalling end points within an SS7 network address or communicate with other entities using point codes. For example, originating point codes and destination point codes are used to identify source and destination entities within a network. The point codes are carried by or available from the MTP3 layer of the SS7 protocol stack. An SS7 network comprises a set of signalling points having respective point codes unique to that set.

Within European signalling networks based on the ITU Recommendations (Q Series) no regulatory organisation equivalent to ANSI, which imposes a numbering plan, exists to ensure SS7 entities in different SS7 networks have globally unique point codes. Thus, the situation may be encountered where a SS7 node in one SS7 network might use the same point code as another SS7 node in another SS7 network.

SUMMARY OF INVENTION

This invention is directed generally to the problem of directly or indirectly coupling a signalling point such as, for example, a signalling end point to more than one SS7 network.

Accordingly, a first aspect of embodiments provides a method to support communication with first and second network entities of respective networks; the first and second entities having a common address, the method comprising processing at least one of a message associated with the first network entity by translating between the common address for the first network entity and a first symbolic address unique to the first and second networks and a message associated with the second network entity by translating between the common address for the second network entity and a second symbolic address unique to the first and second networks; and addressing at least one of the first network entity using the first symbolic address and second network entity using the second symbolic address.

The invention is particularly suitable for implementation where the first and second network entities are SS7 signalling nodes and the translation step is carried out in a signalling gateway, such as a SIGTRAN signalling gateway, although it will be understood that application of the technique in other similar or comparable situations is not excluded.

Thus, embodiments of the present invention allow multiple SS7 networks to be accommodated and, more particularly, allow network entities having a common address to be individually addressed, by a single signalling end point, such as an SIGTRAN application server process, for instance.

Embodiments provide a method to support communication with first and second network entities of respective networks; the first and second entities having a common address, the method comprising processing a message associated with the first network entity by translating between the common address for the first network entity and a first symbolic address unique to the first and addressing the first network entity using the first symbolic address.

Other aspects of embodiments of the invention provide a communication system comprising means to implement the above described methods, a signalling gateway and application server adapted for use in a such communication system and associated computer programs comprising code for implementing the system or methods.

Further preferred aspects of embodiments of the present invention are described hereafter and defined in the appended claims.

BRIEF DESCRIPTION OF THE DRAWINGS

Embodiments of the present invention will now be described, by way of example only, with reference to the accompanying drawings in which.

DETAILED DESCRIPTION OF EMBODIMENTS

Figure 1:
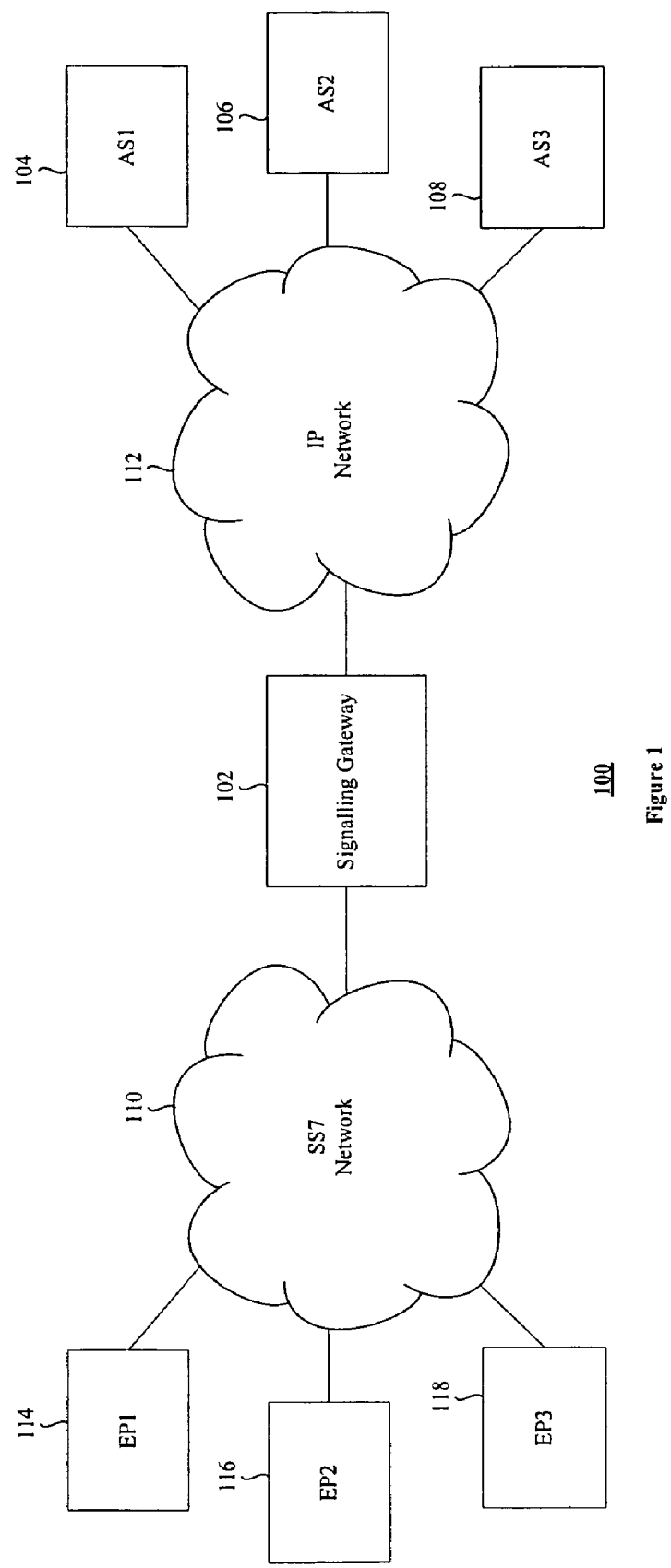
FIG. 1 shows a known SIGTRAN signalling architecture.

Referring to FIG. 1, there is shown a signalling architecture 100, known as the SIGTRAN architecture as established by the IETF SIGTRAN working group. The architecture 100 comprises two main entities to support the following protocols over SCTP. A first protocol, M2UA, defines a protocol to transport any MTP 2-User signalling such as, for example, MTP 3 signalling. A second protocol, M3UA, defines a protocol to transport any MTP3-User signalling such as, for example, SCCP and ISUP. The third protocol, SUA, defines a protocol to transport any SCCP-user signalling such as, for example, TCAP. The two main entities comprise a signalling gateway (SG) 102 and one or more application servers (AS) 104 to 108. The signalling gateway 102 acts as a connection point between an SS 7 network 110 and an IP network 112 in such a way that the SIGTRAN protocol can be used to connect an SS 7 signalling end point, such as one or more of the illustrated end points 114 to 118, with an IP signalling end point such as one or more of the application servers 104 to 108 illustrated. It will be appreciated that this supports backhauling of existing SS 7 applications over an IP backbone and also makes the IP-based applications 104 to 108 available to SS 7 network entities, which are illustrated as comprising one or more end points such as the three end points 114 to 118 illustrated. As is well understood within the art, the signalling gateway 102 provides a nodal inter-working function to convert SS 7 signal messages to SIGTRAN signals and, more particularly, to M2UA signalling.

Figure 2:
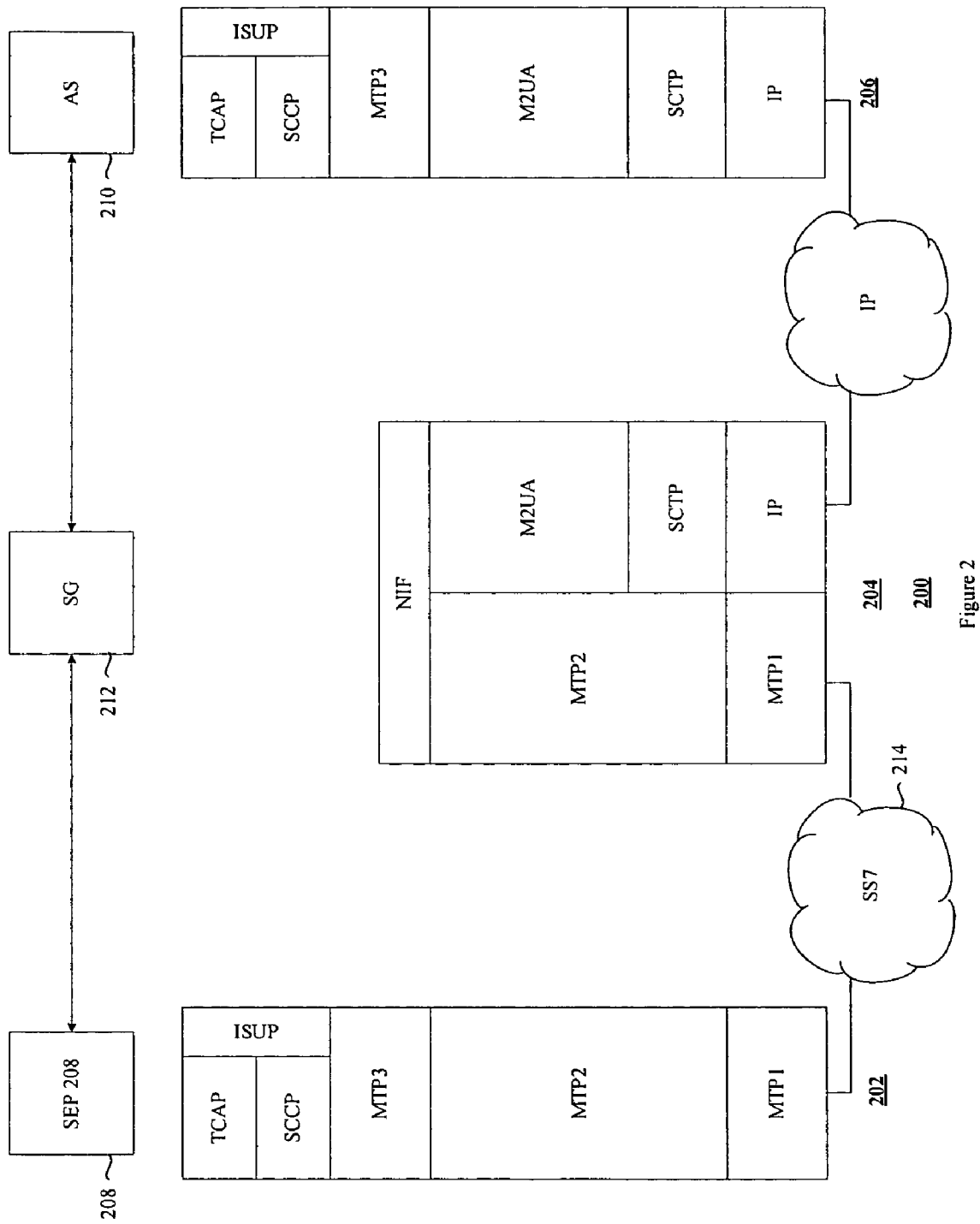
FIG. 2 illustrates a number of protocol stacks corresponding to the architecture of FIG. 1.

FIG. 2 illustrates an arrangement 200 of a number of protocol stacks 202 to 206 for exchanging signalling, via signalling messages, between a signalling end point 208 and an application server 210 via a signalling gateway 212. The signalling end point 208 uses an SS 7 protocol 202 to communicate, via an SS 7 network 214, with the signalling gateway 212. A fundamental principle of the signalling system structure of SS 7 is the division of operations into a common Message Transfer Part (MTP) and separate User Parts for different users. The overall function of the Message Transfer Part is to serve as a transport system to provide reliable transfer of signalling messages between locations of communicating user functions. From the perspective of SS 7 MTP, the User functions are: the ISDN User Part (ISUP), the Telephone User Part (TUP), the Signalling Connection Control Part (SCCP) and the Data User Part (DUP). These User functions are examples of level 4 User Parts or MTP User functions. It will be appreciated that the term "User" in this context refers to any functional entity that utilises lower functional entities such as, for example, the transport capability provided by the Message Transfer Part. It will be appreciated that the SS 7 protocol 202 is illustrated as comprising a number of layers which are well understood by those skilled in the art and which are described in great detail in the Series Q. Recommendations of the ITU. Therefore, a detailed description of only those parts of the SS 7 recommendations that are pertinent to embodiments of the present invention will be given.

The second protocol stack 204 relates to the SIGTRAN protocol stack. Again, the operation of this stack is well known to those skilled in the art from, for example, IETF RFC 3331 and only those parts that are used in the explanation of embodiments of the invention will be described in detail. Finally, the third protocol stack 206 is the client aspect of the SIGTRAN protocol. Once again, the operation of only those parts of the SIGTRAN protocol useful for describing embodiments of the present invention will be explained.

Figure 3A:
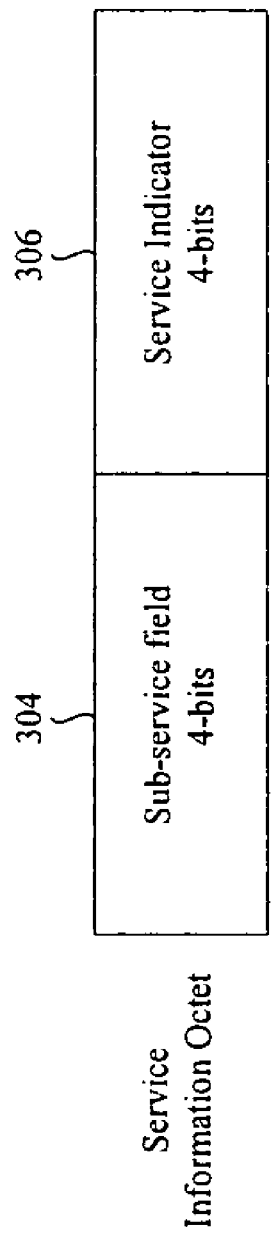
FIGS. 3A & 3B depict a known service information octet and routing label of ITU Recommendation Q.700 respectively.
Figure 3B:
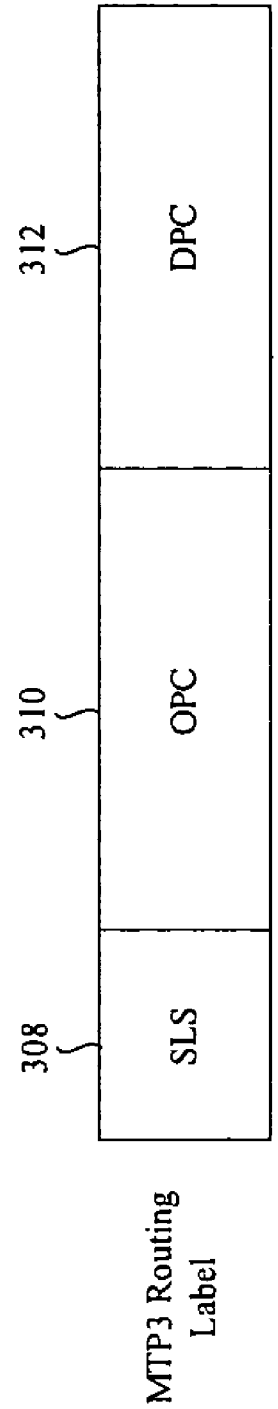

FIG. 3 illustrates a pair of data structures 300 and 302 relating to ITU Recommendations (Q Series). The first data structure 300, shown in FIG. 3A, is a Service Information Octet (SIO) comprising a Sub-service field 304 of 4-bits and a Service Indicator field (306) of 4-bits. The subservice field 304 contains a network indicator (eg national or international) and a message priority (0 to 3, with 3 being the highest). The service indicator specifies the MTP user to support decoding of any payload information. The second data structure, shown in FIG. 3B, is a routing label 302 such as is described in section 5.1, entitled "Signalling message structure", of ITU Recommendation Q.700. It will be appreciated that the routing label 300 comprises a Signalling Link Selection (SLS) field 308, an Originating Point Code (OPC) field 310 and a Destination Point Code (DPC) field 312. The routing label 302 is part of a signalling message that is an assembly of information, defined at level 3 or level 4 of the SS 7 protocol. The DPC is determined from and inserted into the routing label by a level 4 MTP-User. The same is also generally true in respective the OPC. However, it is possible that the OPC could be inserted by the MTP if it is constant.

Figure 4:
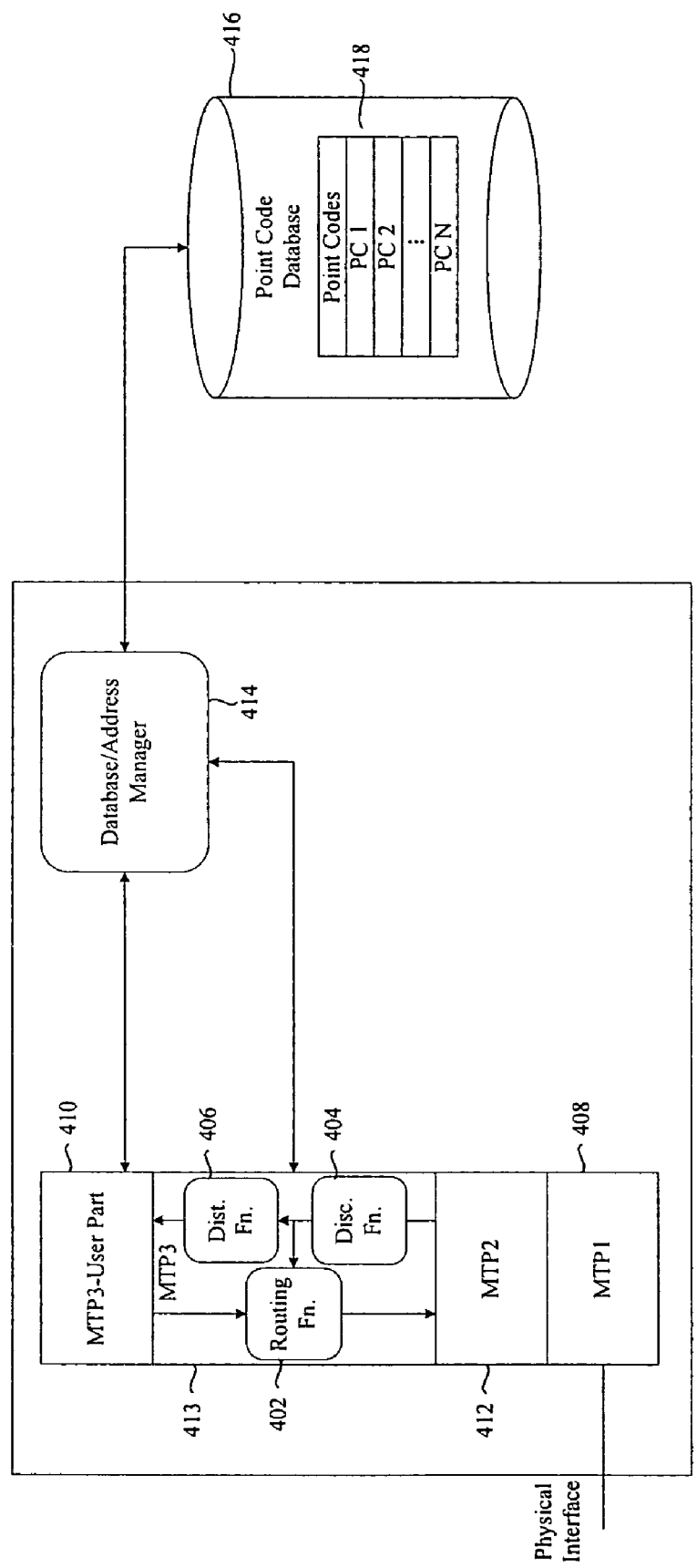
FIG. 4 shows an operating of an SS7 node.

FIG. 4 schematically illustrates a prior art SS7 node 400 comprising message routing, discrimination and distribution functions 402 to 406 within the MTP 3 layer of the SS7 stack 408. It will be appreciated that the message routing function 402 is concerned with messages to be sent from the node 400. The message distribution function 404 is concerned with messages received by the SS7 node 400. The SP/STP discrimination function 404 is used to determine from the DPC whether or not a received message is destined for the network entity currently processing it, that is, the node 400, or whether it should be forwarded to another SP/STP. The relationship between these three functions 402 to 406 and a level 4 MTP-User part 410 and MTP 2 412 shows that signalling messages are received from MTP 2 412 and processed by the SP/STP discrimination function 404. If the discrimination function 404 determines that the received signalling message is destined for the present network entity, that is, the SS7 node 400, the signalling message is passed to the distribution function 406 for forwarding to the appropriate level 4 MTP-User part. However, if the discrimination function 404 determines that the signalling message is destined for another network entity such as, for example, another SP or STP or some other network entity, the signalling message is handled by the routing function 402, which passes it to the MTP 2 function 412 for appropriate processing and onward routing. It should be noted that the routing function 402 is also responsive to MTP 3-User part input, that is, to input from a level 4 MTP 3 User.

There are two aspects to the addressing mechanism in the MTP. The first aspect of the mechanism uses the destination point code that is included in the routing label of every message signal unit. The second aspect makes use of a service indicator and network indicator indicated within the service information octet 302.

The node 400 also comprises a database manager 414 for managing access to a database 416 containing a table 418 of point codes of network entities accessible via the node 400. The database 416 is used during provisioning to allow the MTP 3 layer 413 of the protocol stack 408 to select the appropriate signalling link, allowing then the MPT2 layer 412 of the protocol stack 408 to select the appropriate physical link for onward routing of any signalling messages.

Figure 5:
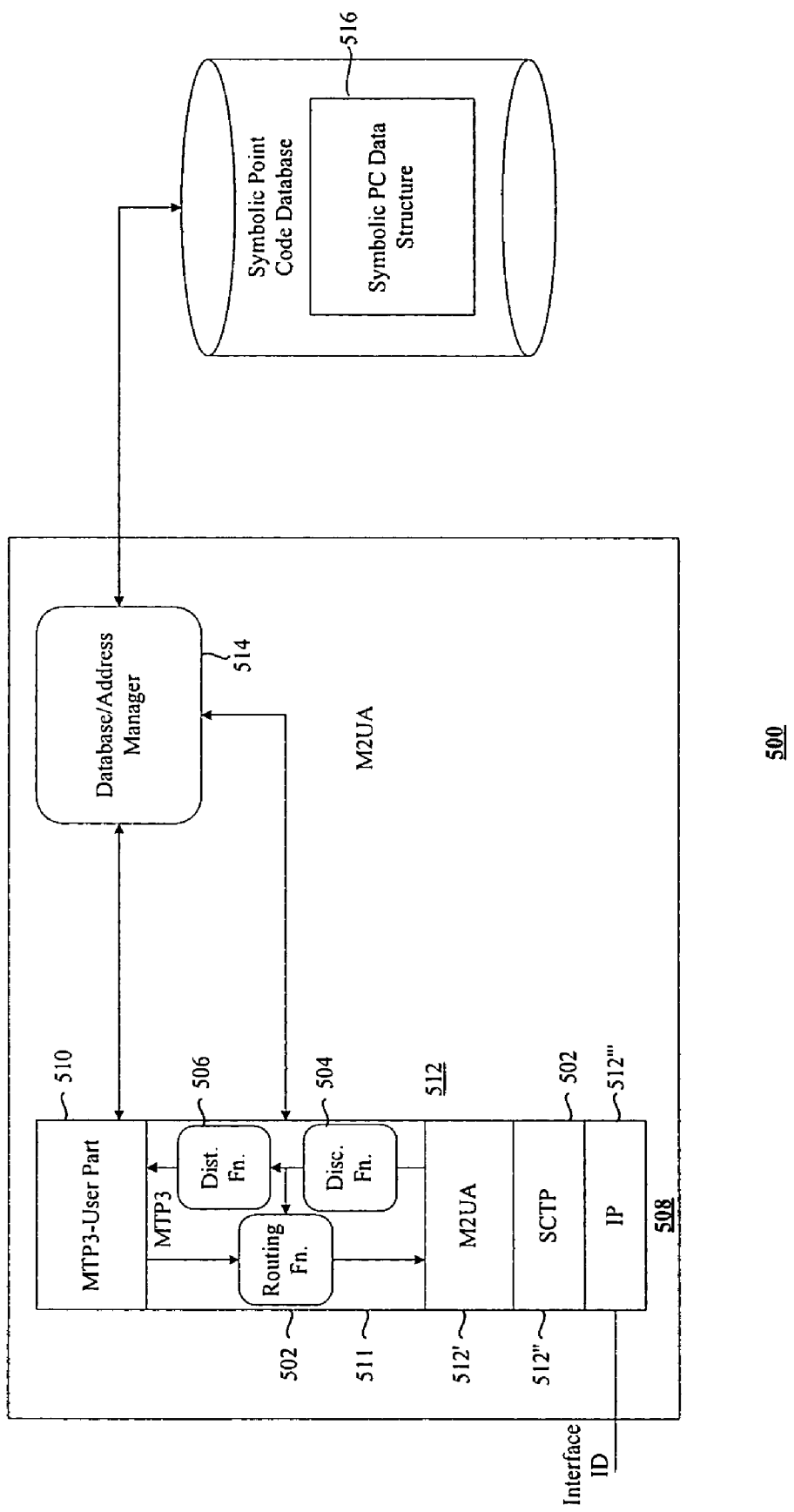
FIG. 5 illustrates a network entity according to an embodiment.

FIG. 5 depicts a SIGTRAN according to an embodiment. The node comprises a client SIGTRAN communication stack 502. It will be appreciated that the message routing function 502 is concerned with messages to be sent from the node 500. The message distribution function 504 is concerned with message received by the SS7 node 500. The SP/STP discrimination function 504 is used to determine from the DPC whether or not a received message is destined for the network entity currently processing it, that is, the node 500, or whether it should be forwarded to another SP/STP. The relationship between these three functions 502 to 506 and a level 4 MTP user part 510 and lower layers 512, which are, M2UA 512', SCTP 512" and IP 512''' layers, shows that signalling messages are received from M2UA 512' and processed by the SP/STP discrimination function 504. If the discrimination function 504 determines that the received signalling message is destined for the present network entity, that is, the SS7 node 500, the signalling message is passed to the distribution function 506 for forwarding to the appropriate level 4 MTP User part. However, if the discrimination function 504 determines that the signalling message is destined for another network entity such as, for example, another SP or STP or some other network entity, the signalling message is handled by the routing function 502, which passes it to the M2UA function 512' for appropriate processing and onward routing. It should be noted that the routing function 502 is also responsive to MTP 3-User part input, that is, input from a level 4 user.

The node 500 also comprises a database manager 514 for managing access to a database 516 containing point codes of network entities accessible via the node 500.

The database 516 is used during provisioning to allow the MTP3 layer 511 of the protocol stack 508 to select the appropriate signalling link, allowing then the M2UA layer 512' of the protocol stack 508 to select the appropriate Interface ID for onward routing of any signalling messages.

A difference between the embodiment of an SS7 node 500 described with reference to FIG. 5 and the node 400 described with reference to FIG. 4 resides in the type of address information used. It should be noted that the addresses used in the database 516 are symbolic addresses, that is, they are not real or actual point code addresses of other network entities but merely represent a set of alternative, that is, surrogate, addresses for those network entities. The set of alternative addresses for those network entities is arranged so that each network entity accessible via the signalling point of SS 7 node 500 has an associated surrogate address unique to the set notwithstanding any network entities having duplicate real point codes. Therefore, rather than inserting the destination point code and originating point code into an MTP 3 message and, more particularly, into the MTP 3 label 300, the node 500 uses the symbolic addresses, rather than actual point codes, associated with the network entities to be addressed. It will be appreciated that this will be transparent from an SS7 protocol perspective. It will be appreciated that the format of an M2UA data message comprises a protocol data field. The protocol data field is arrange to contain the MTP3 message, that is, the protocol data field comprises a MTP2-User application message in network byte order starting with the service information octet.

Signalling messages are passed down through the protocol stack 502 in the conventional manner and transmitted to a signalling gateway such as SG 212, where they are processed by appropriate functions associated with the M2UA side of the SIGTRAN protocol stack 204 at the SG 212.

Figure 6:
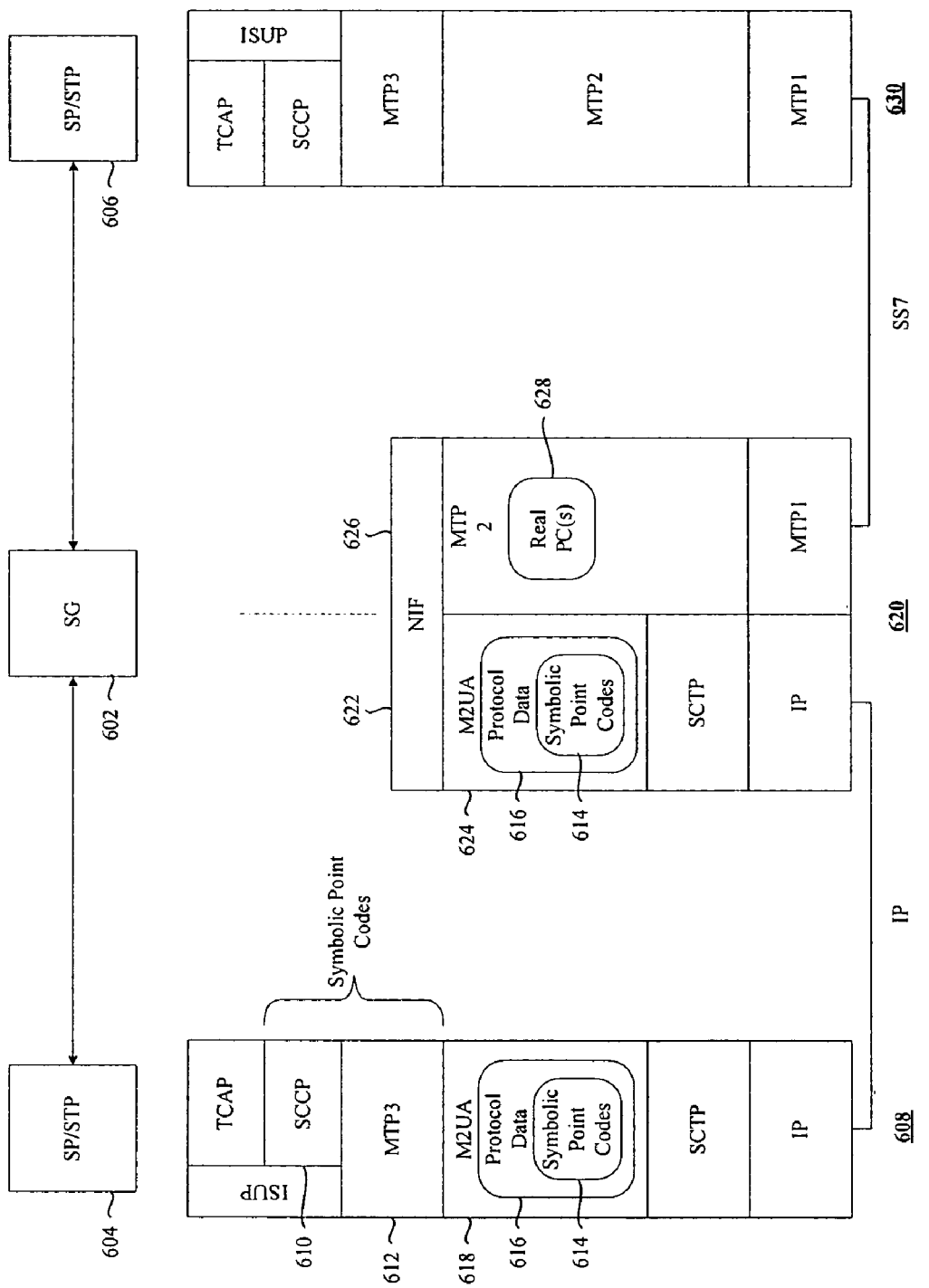
FIG. 6 depicts a number of protocols associated with signalling according to embodiments of the invention.

Referring to FIG. 6, there is shown schematically an interaction 600 between a signalling gateway 602 according to an embodiment and a pair of SPs 604 and 606. Although the interaction will be described generically, it will be appreciated that a first SP 604 of the pair can be the SS7 node 500 and a second SP 606 of the pair can be one of the network entities of another SS7 network.

A first SIGTRAN protocol stack 608 associated with the first SP 604 comprises a number of layers. Of particular interest are the SCCP 610 and the MTP3 612 layers, which are arranged to contain a symbolic point code or codes 614 mentioned above in relation to FIG. 5 rather than a real point code or real point codes at the appropriate places. The MTP3 signalling message passed down the protocol stack and is transported via M2UA Protocol Data 616 of the M2UA layer 618. The transport mechanism or protocol thereafter is well understood and will not be described in detail.

A second SIGTRAN protocol stack 620 comprises a first half 622 that mirrors the lower three layers of the first protocol stack 608. Again, it can be appreciated that the protocol data 616 of the M2UA message of the M2UA layer 624 contains the symbolic point code or codes 614. At least the symbolic DPC is replaced with a corresponding real point code retrieved from a data structure described in detail later with reference to FIG. 7. The real point code corresponds to a real point code of a network entity to which the message originating from the SP 604 is destined. It can be appreciated that the second protocol stack 620 has a second half 626, which contains the real point code or codes 628 in the appropriate place or places, determined according to the symbolic point code or codes being in used at both the SCCP and MTP3 levels in the first protocol stack 608. The interaction between the second half 626 of the second protocol stack 620 and an SS7 protocol stack 630 of a network entity having the DPC contained within the real point code or codes 628 is conventional and will not be described in detail.

It will be appreciated that at least one of the DPC and OPC within the SCCP or MTP3 levels of the protocol contain data other than real point code data, that is, they contain data from which real point code data could be derived or identified, that is, they contain symbolic addresses.

Figure 7:
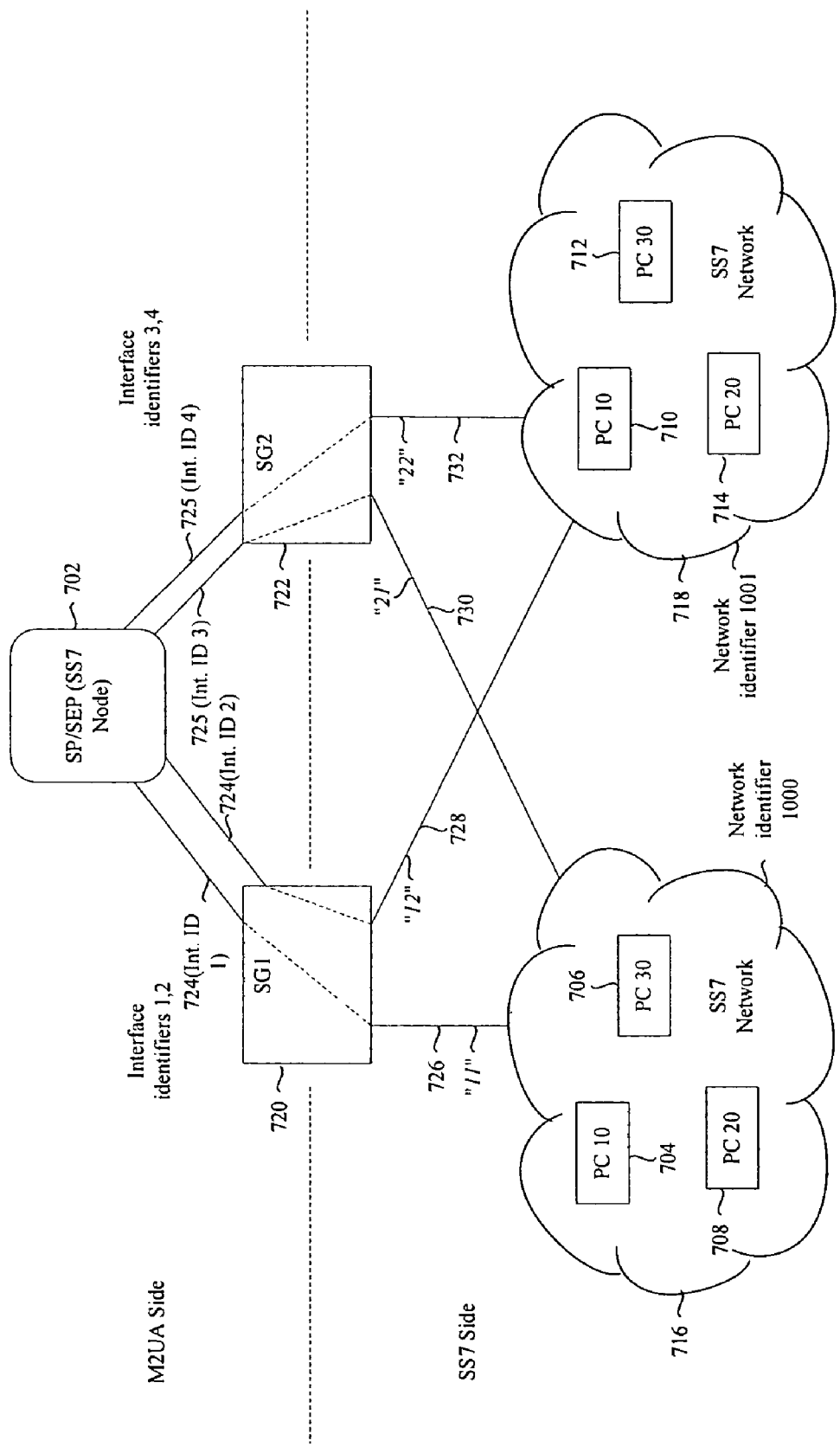
FIG. 7 illustrates a communication arrangement comprising network entities communicating with a pair of signalling networks.

FIG. 7 schematically shows a communication arrangement 700 comprising an SP 702 in communication with a number of SS7 network entities 704 to 714. A first plurality 704 to 708 of the SS7 network entities forms a first SS7 network 716. A second plurality 710 to 714 of the network entities forms a second SS7 network 718. The SP 702 communicates with the network entities 704 to 714 of via a number of signalling gateways 720 and 722. The interaction between the SP 702 and any of the network entities 704 to 714, via either of the signalling gateways 720 and 722, will be substantially as described above with reference to FIG. 6. It will be appreciated that each of the network entities 704 to 714 has a respective point code. For example, the point code of a first network entity 704 is schematically represented by "PC 10". One skilled in the art will appreciated that "PC 10" has, for the purposes of illustration and brevity, being used to represent the 14 digit point code defined in the ITU Q series recommendations for SS 7. It will be appreciated that the SP 702 communicates, via M2UA, with the signalling gateways 720 and 722. In essence, the SP 702 is connected to the SS 7 networks 716 and 718 and, more particularly, to the SS 7 network entities 704 to 714 using an intermediate IP protocol rather than via an SS 7 protocol. It can be appreciated that the signalling gateways 720 and 722 are coupled to the networks in parallel.

The SP 702 forwards symbolic address data as part of the protocol data, that is, payload, of an M2UA data message. The signalling gateway receiving the M2UA data message extracts the symbolic point code and uses it to determine or to identify a corresponding real point code together with an indication of the physical link to which an SS 7 MTP 2 signalling message, incorporating the real point code, should be sent to reach the network entity having that real point code.

Figure 8:
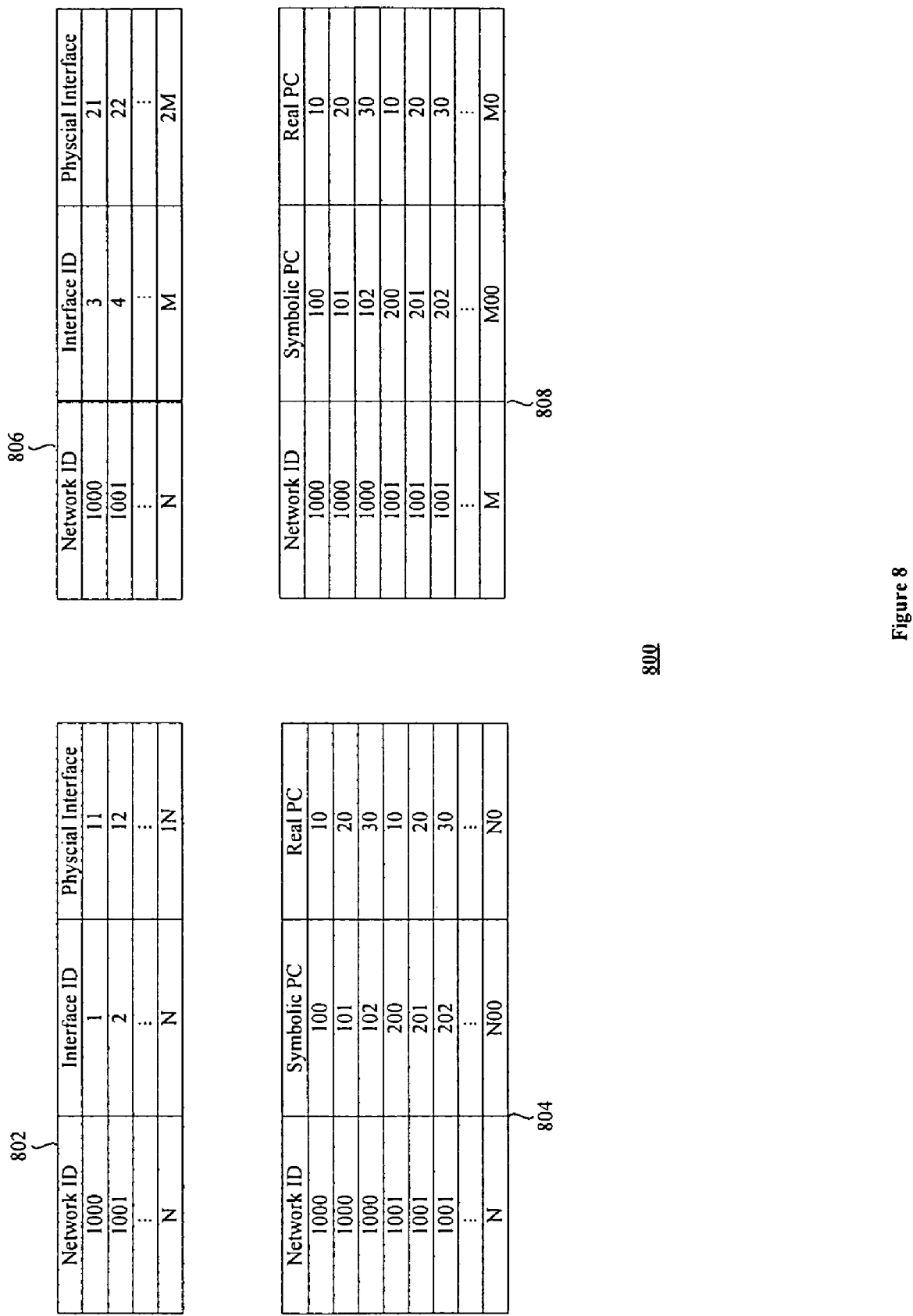
FIG. 8 shows a number of data structures according to embodiments of the present invention.

It will be appreciated that FIG. 7 is divided into an M2UA side and an SS 7 side. It can be appreciated that the interaction between the signalling gateways 720 or 722 and any of the plurality of network elements 704 to 714 is conventional and uses the SS 7 protocol. Similarly, the interaction, from a protocol perspective, between the SP 702 and either of the signalling gateways 720 or 722 on the M2UA side is conventional but for the use of symbolic point codes as opposed to real point codes. Therefore, it will be appreciated that implementing an embodiment of the present invention require no real changes of substance to the source or destination points such as, for example, the SP 702 or any of the SS 7 network entities 704 to 714 FIG. 8 illustrates a collection 800 of data structures used during the operation of the communication arrangement 700 illustrated in FIG. 7. The data structures associated with the first signalling gateway 720 comprise a first table 802 containing a mapping between one or more network interfaces associated with a signalling link or channel between the SP 702 and the signalling gateway 720 and one or more physical interfaces associated with one or more signalling links or channels between the signalling gateway 720 and the first 716 and second 718 SS 7 networks. This mapping is defined in ETF RFC 3331. In addition to this mapping, embodiments provide a further identifier, known as the network identifier. There is a relationship between a network identifier and an "Interface ID—Physical Id" pair. It will be appreciated that there is a one-to-one relationship between the signalling links on the M2UA side and the signalling links on the SS 7 side of the first gateway 720. This one-to-one relationship arrangement is achieved as part of the provisioning of the SP 702 and the signalling gateway 720. For example, it can be appreciated that the illustrated first table 802 describes a one-to-one relationship between an incoming signalling link from the M2UA side, having an interface ID of "1" and an SS 7-side physical interface 726 labelled "11". The same applies in relation to a second interface identifier "2" and a second physical interface 728 labelled "12".

The data structures illustrated in FIG. 8 also comprise a second table 804 that depicts a number of mappings between network identifiers, symbolic point codes and real point codes. For example, in the illustrated table 804, it can be appreciated that there is a relationship between network identifier "1000", symbolic point code "100" and real point code "10". Similarly, it can be appreciated that there is a relationship between network identifier "1001", symbolic point code "200" and real point code "10". Therefore, the first signalling gateway 720 is able to distinguish between messages destined for one 704 of the SS 7 network entities 704 or 710 having a real point code of "10" by, first looking at the interface identifier associated with the received message to find, in table 802, the network identifier corresponding to this interface identifier. Once the network identifier is determined, table 804 is used to identify the corresponding between the real and symbolic PCs. By way of example, if the first signalling gateway 720 receives a signalling message, via an M2UA signalling link having an interface identifier of "1", containing a symbolic point code of "100", then the first signalling gateway 720, having consulted the 802 table will determine that the message is tied to Network Identifier 1000. Then, having consulted the second table 804, will route the message, having converted from the M2UA format to the MTP 2 format, via the first physical interface 726 to the network entity 704 having the real point code 10. Similarly, if the first signalling gateway 720 receives a signalling message, via an SS7 signalling link having a physical interface of "12", containing a real point code of "20", then the first signalling gateway 720, having consulted the 802 table, will determine that the corresponding network identifier is "1001". Then, having consulted the second table 804, will route the message, having converted from the MTP 2 format to the M2UA format, via the second M2UA Interface Id 724 to the SS7 node 702, optionally containing the symbolic point code 201.

Similarly, the data structures associated with the second signalling gateway 722 comprise a first table 806 containing a mapping between one or more interface identifiers associated with a signalling link or channel between the SP 702 and the signalling gateway 722 and one or more physical interfaces associated with one or more signalling links or channels between the signalling gateway 722 and the first 716 and second 718 SS 7 networks. Again, a new attribute is introduced in this table, that is, a network identifier. It will be appreciated that there is a one-to-one relationship between the signalling links on the M2UA side and the signalling links on the SS 7 side of the second gateway 722. This one-to-one relationship arrangement is ensured as part of the provisioning of the SP 702 and the signalling gateway 722. It can be appreciated that the illustrated first table 806 describes a one-to-one relationship between an incoming signalling link from the M2UA side, having an interface ID of "3", and an SS 7-side physical interface 730 labelled "21". The same applies in relation to the second interface identifier "4" and the second physical interface 732 labelled "22".

The data structures illustrated in FIG. 8 also comprise a second table 808 associated with the second gateway 722 that depicts a number of mappings between network identifiers, symbolic point codes and real point codes. For example, in the illustrated table 808, it can be appreciated that there is a relationship between Network identifier "1000", symbolic point code "100" and real point code "10". Similarly, it can be appreciated that there is a relationship between network identifier "1001", symbolic point code "200" and real point code "10". Therefore, the second signalling gateway 722 is able to distinguish between messages destined for one of the SS 7 network entities 704 or 710 having a real point code of "10" according to the interface identifier the corresponding network identifier, by consulting table 806 and associated with the received message. By way of example, if the second signalling gateway 722 receives a signalling message, via a M2UA signalling link having an interface identifier of "3", containing a symbolic point code of "100", then, having consulted table 806, it could figure out that the corresponding network identifier is "1000", and then having consulted the second table 808 associated with the second signalling gateway 722, will route the message, having converted from the M2UA format to the MTP 2 format, via the first physical interface 730 to network entity 704 having the real point code "10". Similarly, if the second signalling gateway 722 receives a signalling message, via an SS7 signalling link having a physical interface of "22", containing a real point code of "20", then the second signalling gateway 722, having consulted table 806 will figure out that network identifier is 1001, and then after the second table 808 to perform the conversion between real and symbolic point codes, will route the message, having converted from the M2UA format to the MTP 2 format, via the second physical interface 732, optionally containing the symbolic point code 200.

It will be appreciated that the embodiment described with reference to FIG. 7 uses two signalling gateways 720 and 722 for purposes of illustration only. Two signalling gateways can be used or operated in parallel to improve reliability or to provide a High-Availability system. However, embodiments of the present invention can equally well use a single gateway.

It should be noted that embodiments are not limited to the set of interface identifiers and the set of physical identifiers being labelled consecutively in either table.

Figure 9:
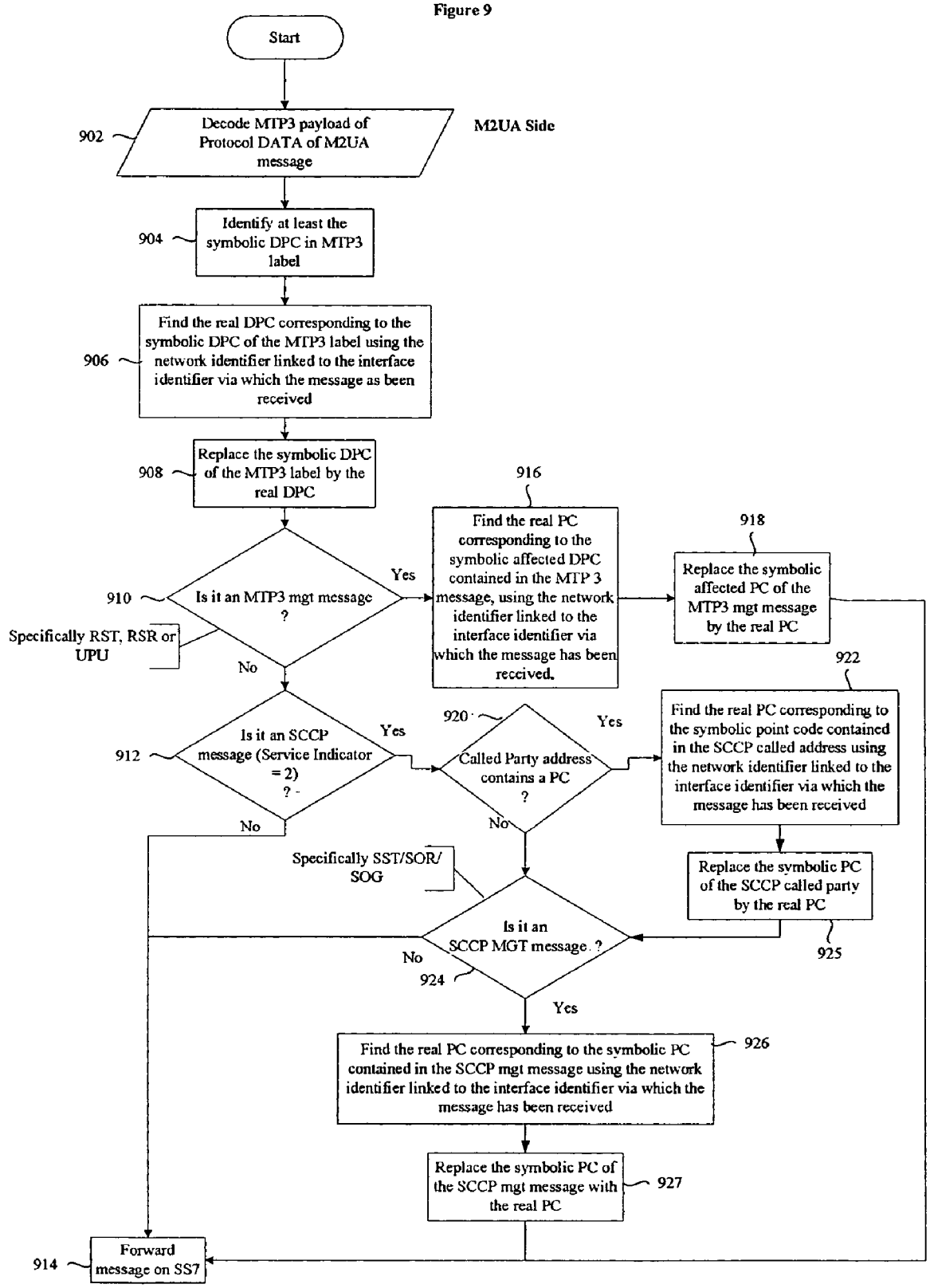
FIG. 9 depicts a first flowchart of processing of embodiments of the invention.

FIG. 9 shows a flowchart 900 of processing undertaken by a signalling gateway according to an embodiment of the present invention in response to receiving a signalling message from the M2UA side. At step 902, the MTP 3 payload contained within the protocol data of an M2UA message is decoded or extracted. At least the symbolic destination point code contained within the MTP 3 payload is identified at step 904. The real destination point code corresponding to the symbolic destination point code is identified, via the tables shown in FIG. 8, at step 906 using network identifier linked to the interface identifier by which the signalling message SP was received. The symbolic DPC is replaced by the real DPC at step 908. A determination is made at step 908 regarding whether or not the MTP 3 payload relates to an MTP 3 management message such as, for example, an RST, RSR or UPU message. If the determination at step 910 is negative, a determination is made at step 912 regarding whether or not the MTP 3 payload is associated with an SCCP message, optionally, having a service level indicator of two. If the determination at step 912 is negative, the signalling message is forwarded using conventional SS7 at step 914.

If the determination at step 910 is positive, the real point code corresponding to the symbolic affected PC contained within the MTP 3 management message is determined at step 916, via the tables of FIG. 8, using the network identifier linked to the interface identifier via which the message was received and the symbolic affected PC is replaced within the MTP 3 management message by the corresponding real affected PC at step 918 and thereafter processing resumes at step 914.

If the determination at step 912 is positive, a determination is made at step 920 as to whether or not the payload, that is, SCCP message, contains a point code in the SCCP Called Party field. If the determination at step 920 is positive, the real point code corresponding to the symbolic point code contained within the Called Party field is located at step 922 using the tables of FIG. 8 and the network identifier linked to the interface identifier via which the message was received. The symbolic PC of the SCCP called party address is then replace by the corresponding real point code at step 925 and thereafter processing resumes at step 924. If the determination at step 920 is negative, a determination is made at step 924 as to whether or not the payload comprises an SCCP management message such as, for example, an SST, SOR or SOG message. If the determination at step 924 is positive, the real PC corresponding to the symbolic PC present in the SCCP management message is determined at step 926 using the tables of FIG. 8 and the network identifier associated with the interface identifier via which the message was received and the symbolic PC is replaced by the corresponding real PC at step 927. If the determination at step 924 is negative, processing resumes from step 914, where the message is forwarded using the real DPC in the MTP3 label.

Figure 10:
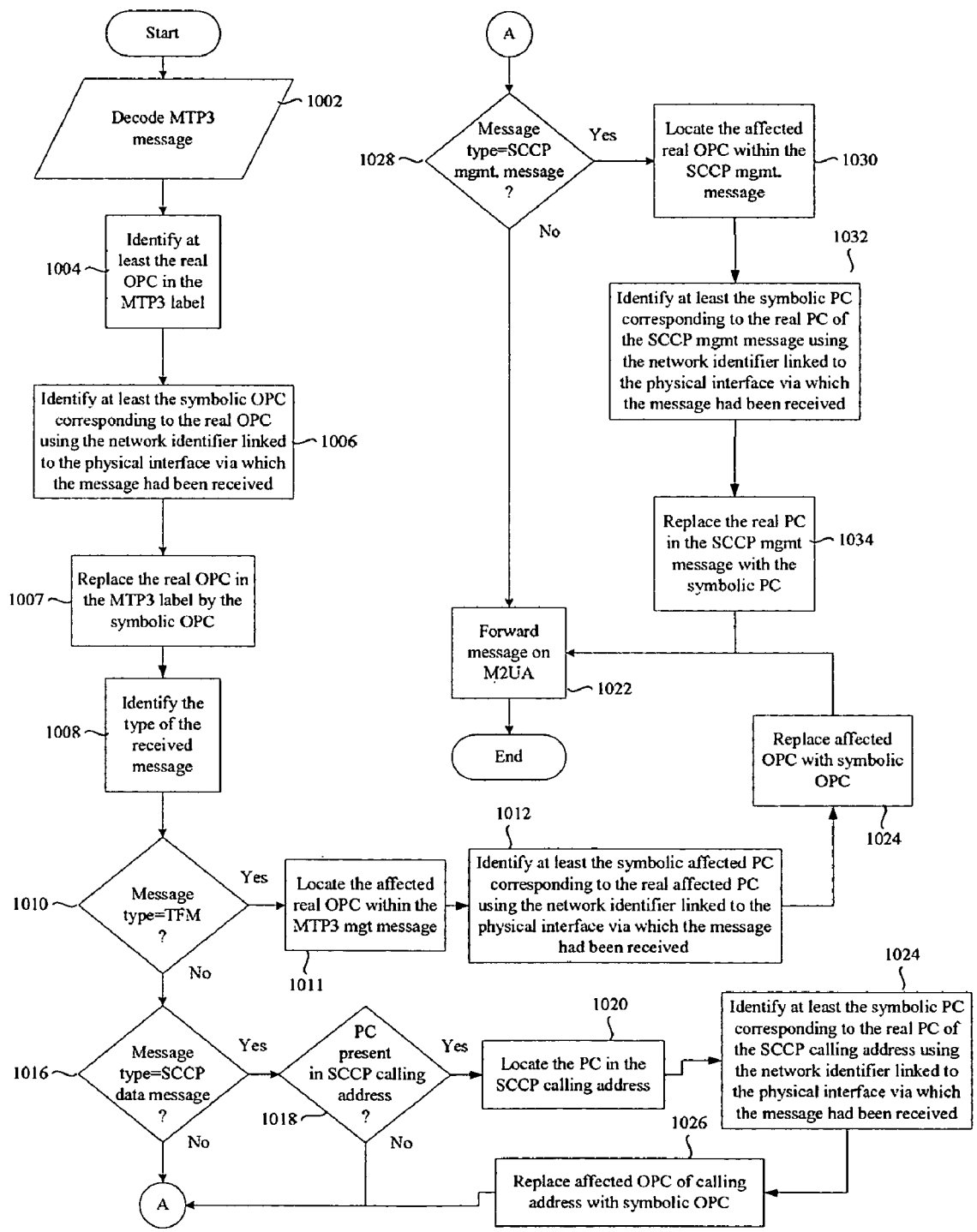
FIG. 10 illustrates a second flowchart of processing according to embodiments of the present invention.

FIG. 10 shows a flowchart 1000 of processing undertaken by a signalling gateway according to an embodiment of the present invention in response to receiving a signalling message from the SS 7 side. The MTP 3 signalling message is decoded at step 1002. The real originating point code of that signalling message is identified in the MTP3 label at step 1004. The symbolic originating point code corresponding to the identified real originating point code is determined in conjunction with the physical interface and its corresponding network identifier by which the MTP 3 signalling message was received at step 1006. The real OPC is then replaced by the corresponding symbolic point code at step 1007. The type of the received signalling message is identified at step 1008. A determination is made, at step 1010, as to whether or not the type of the received signalling message is TFM. If the determination at step 1010 is positive, the affected PC is located within the MTP3 message at step 1011, the symbolic PC corresponding to this affected PC is found at step 1012 and the affected PC contained within that message is replaced with a symbolic destination point code at step 1014. Thereafter, processing resumes at step 1022. If the determination at step 1010 is negative, a determination is made at step 1016 as to whether or not the type of the received signalling message reveals it to be an SCCP data message. If the received signalling message is an SCCP data message, a determination is made at step 1018 to determine if the SCCP calling address of the message contains a PC. If the determination at step 1018 is positive, the real PC contained in the SCCP calling party address is located within the message at step 1020, the corresponding symbolic PC is located at step 1024, and the PC of the SCCP calling address field is replaced with the symbolic PC at step 1026. If the determination at step 1018 is negative, processing resumes at step 1028. If the determination at step 1016 is negative, a determination is made at step 1028 as to whether or not the received signalling message is an SCCP management message. If the determination at step 1028 is positive, the real PC of interest is located within the message at step 1030, the corresponding symbolic PC is identified at step 1032 using the tables of FIG. 8 and the network identifier associated with the physical interface via which the message was received, and the real PC of interest contained within the SCCP management message is replaced with the symbolic PC of interest at step 1034. Thereafter, or if the determination at step 1028 is negative, processing resumes at step 1022 when the signalling message is forwarded using M2UA to the SP having the corresponding symbolic OPC.

It can be appreciated from the above that address substitution can occur at many levels within the communication protocol. In essence, the address data of one layer of the protocol forms part of the payload of a message of a different layer of the protocol such as a lower layer of the protocol. Accordingly, address substitution occurs within a payload of a message in addition to or as an alternative to address substitution within an address field of the message.

It will be appreciated that point codes, whether real or symbolic, are merely embodiments of real or symbolic addresses used to access network entities and, in particular, to carrying or route signalling message between or to those network entities.

The above embodiments have been described with reference to symbolic addresses being used for both of the network entities 706 and 712 having a common address, PC30, embodiments are not limited to such an arrangement. Embodiments can be realised in which symbolic addressing is used for only one of the network entities, which results in both network entities being addressable without conflict. For example, a first network entity such as entity 706 might use conventional addressing, while a second entity 712 might use symbolic addressing or visa versa. It will be appreciated that such an embodiment finds particular application when two network entities share a common address. Embodiments in which a number of entities share a common address can be realised in which either all of those entities are addressable using respective symbolic addresses or all but one of the number of entities use symbolic addresses with the exception using conventional addressing.

The invention claimed is:

1. A method to support communication with a first network entity in a first network and a second network entity in a second network, the first and second network entities having a common address, the method comprising:
    receiving at a signaling gateway a message including the common address via a signaling link having an interface identifier;
    using the interface identifier of the signaling link to determine whether the message is for the first network or the second network;
    processing in the signaling gateway at least one of a message associated with the first network entity by translating between the common address for the first network entity and a first symbolic address unique to the first and second networks for routing the message to one of the first network entity and the second network entity as a destination and a message associated with the second network entity by translating between the common address for the second network entity and a second symbolic address unique to the first and second networks for routing the message to one of the first network entity and the second network entity as the destination; and
    sending the message by the signaling gateway to at least one of the first network entity using the first symbolic address and second network entity using the second symbolic address.

2. A method as claimed in claim 1 in which the step of processing a message associated with the first network entity by translating between the common address for the first network entity and a first symbolic address unique to the first and second networks comprises performing multiple substitutions of the common address with the first symbolic address.

3. A method as claimed in claim 2 in which the step of performing multiple substitutions of the common address with the first symbolic address comprises performing substitutions of the common address with different levels of a first protocol for communicating with the first network entity.

4. A method as claimed in claim 1 in which the step of processing a message associated with the second network entity by translating between the common address for the second network entity and a second symbolic address unique to the first and second networks comprises performing multiple substitutions of the common address with the second symbolic address.

5. A method as claimed in claim 4 in which the step of performing multiple substitutions of the common address with the second symbolic address comprises performing substitutions of the common address with different levels of a second protocol for communicating with the second network entity.

6. A method as claimed in claim 1 wherein the step of receiving the message at the signaling gateway is from a third network entity destined for the first network entity or the second network entity.

7. A method as claimed in claim 6 in which a protocol associated with the third network entity is different from a protocol associated with at least one of the first and second network entities.

8. A method as claimed in claim 1 in which step of processing comprises substituting at least one instance of the common address contained within a payload portion of the message with a respective one of the first symbolic address and the second symbolic address.

9. A method as claimed in claim 1 wherein the sending step is carried out in an application server process.

10. A computer system for supporting communication with a first network entity in a first network and a second network entity in a second network, the first and second network entities having a common address, the computer system comprising a computer program that, when executed, causes the computer system to:

receive at a signaling gateway a message including the common address via a signaling link having an interface identifier;

use the interface identifier of the signaling link to determine whether the message is for the first network or the second network;

process in the signaling gateway at least one of a message associated with the first network entity by translating between the common address for the first network entity and a first symbolic address unique to the first and second networks for routing the message to one of the first network entity and the second network entity as a destination and a message associated with the second network entity by translating between the common address for the second network entity and a second symbolic address unique to the first and second networks for routing the message to one of the first network entity and the second network entity as the destination; and send the message by the signaling gateway to at least one of the first network entity using the first symbolic address and second network entity using the second symbolic address.

* * * * *

UNITED STATES PATENT AND TRADEMARK OFFICE
CERTIFICATE OF CORRECTION

PATENT NO. : 8,054,829 B2  Page 1 of 1
APPLICATION NO. : 11/491801
DATED : November 8, 2011
INVENTOR(S) : Pierre Garnero et al.

It is certified that error appears in the above-identified patent and that said Letters Patent is hereby corrected as shown below:

In Sheet 10 of 10, Fig. 10, line 1, above "Start" insert -- SS7 Side --.

Signed and Sealed this
Twenty-fifth Day of September, 2012

David J. Kappos
*Director of the United States Patent and Trademark Office*